Sept. 21, 1943.                G. MEISTER                 2,330,072
                    SEAL AND METHOD OF MANUFACTURE
                         Filed May 14, 1941
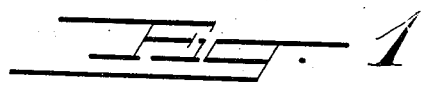
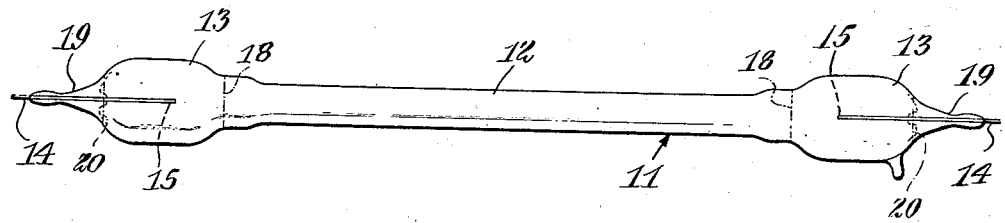
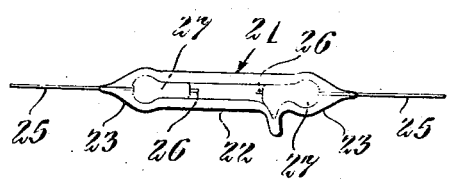
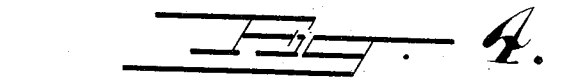
INVENTOR
GEORGE MEISTER
BY
ATTORNEY Patented Sept. 21, 1943

2,330,072

UNITED STATES PATENT OFFICE 2,330,072

SEAL AND METHOD OF MANUFACTURE

George Meister, Newark, N. J., assignor to Westinghouse Electric & Manufacturing Company, East Pittsburgh, Pa., a corporation of Pennsylvania Application May 14, 1941, Serial No. 393,409

15 Claims. (Cl. 49—81)

This application is a continuation-in-part of my application Serial No. 143,464, filed May 19, 1937, and entitled "Seals and method of manufacture."

This invention relates to treated glass and seals, and more particularly to those between quartz, or fused silica, and glass; and those between metal and glass.

The principal object of my invention, generally considered, is the production of treated glass and a simplified seal between such glass and quartz and the reduction of shrinkage in sealing metal wires into such glass.

An object of my invention is the production of a glass which will seal directly to quartz, thereby avoiding graded seals to quartz and the accompanying complications.

Another object of my invention is the treatment of glass to improve its qualities for various purposes, including that of sealing directly to low expansion vitreous material and receiving lead-in conductors composed of tungsten and other suitable metals.

A further object of my invention is the treatment of "Pyrex" and other hard glasses to eliminate gas therefrom and adapt them for sealing directly to quartz, at the same time rendering such glasses better able to seal to lead-in conductors of tungsten and other suitable metals.

A still further object of my invention is the method of treating glass, so that it will retain a vacuum when tungsten is sealed therethrough and seal directly to quartz, comprising removing gases therefrom as by heating to a temperature of about 1700° C.

An additional object of my invention is to seal tungsten wire, even of large size, through "Pyrex" glass.

Other objects and advantages of the invention, relating to the particular arrangement and construction of the various parts, will become apparent as the description proceeds.

Referring to the drawing illustrating my invention,

Fig. 1 is a side elevational view of an electric discharge tube.

Fig. 2 is an enlarged longitudinal sectional view of one end portion of the tube illustrated in Fig. 1.

Fig. 3 is a side elevational view of another discharge tube embodying my invention.

Fig. 4 is an enlarged longitudinal sectional view of one end portion of the tube illustrated in Fig. 3.

Referring to the drawing in detail, and first considering the embodiment of my invention illustrated in Figs. 1 and 2, there is shown an electric discharge tube 11 comprising a central cylindrical or tubular portion 12, relatively small in cross section, and enlarged end portions 13. Through the end portions 13 are sealed tungsten lead-in conductors 14, the inner end portions 15 of which form electrodes between which a discharge occurs through gas or vapor contained in said tube. The tungsten, where it seals through the glass, should be clean and bright. This condition may be obtained by beating the conductors 14 with degasified "Pyrex" prior to sealing into the tube 11, reference being made to the Sullivan et al. Patent No. 1,304,623, granted May 27, 1919, covering such glass. "Pyrex" glass, also known as "702EJ" and "774" has about the following composition: $SiO_2$, 80%; $B_2O_3$, 13%; $Al_2O_3$, 2%; $Na_2O+K_2O$, 4½%; miscellaneous, ½%. The clean bright condition of the tungsten is obtainable by cleaning with sodium nitrite, washing, and then inserting in the reducing portion of an oxyhydrogen flame where it is readily beaded or coated with "Pyrex" or borosilicate glass. This coated wire, up to more than 200 mil diameter, may then be united directly to an article of borosilicate glass by heat in the usual manner.

In the present embodiment, the intermediate restricted portion 12 is formed of a quartz or fused silica tube, the end portions of which are flared in cross section and decreased in thickness, as indicated at 16.

The enlarged or bulbous end portions 13, of the present embodiment, are formed of borosilicate glass, such as "Pyrex," the inner end portions of which are decreased in diameter, as indicated at 17, so as to correspond with the diameter of the end portions 16 of the quartz tube.

In preparing "Pyrex" or other suitable preferably hard glass; for example, "Nonex," which is a borosilicate glass with lead; or 172 A. J., which is a borosilicate glass with aluminum; for direct connection or sealing to quartz, the glass is heated to a temperature of 1700° C.; that is, to about the fusion temperature of quartz. When this is done, there is a considerable evolution of gas.

The fusion of "Pyrex," or other borosilicate glass, for degasification purposes may also be effected in a mass. Due to the high temperature, however, such fusion should be effected in vacuo where a lower temperature, perhaps 1500° C., will be sufficient to remove the gas. How this fusion may be accomplished will depend on the reactivity of the constituents of the glass with the container in which the fusion is effected. Porcelain may be suitable, as well as graphite, and, in the latter case, induction heating may be used. When fusing in porcelain, a furnace wound with wire, formed of such refractory metal as tantalum or tungsten, could be employed. It will, of course, be understood that even under such circumstances only a limited quantity of glass could be degasified at any one time.

If the degasification is continued so that a clear melt results, an adherent seal 18 may be formed between the glass and the quartz, which is equivalent to that of any of the special glasses which have previously been used, reference being made to the Keyes et al. Patent No. 1,014,757 of January 16, 1912.

The foregoing description applies to the formation of a direct seal between the edges of a quartz tube and the degasified edge portions of a "Pyrex" bulb or tube of similar diameter.

Another way to effect the seal is to melt and spread on the edges of the quartz, a section of degasified "Pyrex" which can then be used for effecting the seal with "Pyrex." In such an event, the degasified "Pyrex" will extend an appreciable distance between the portions 16 and 17. In other words, the junction between the quartz and "Pyrex" will be degasified and the melted "Pyrex" extend therebetween for an appreciable distance, at the place designated 18, after being melted and applied to the quartz.

In addition, the "Pyrex" or other glass, such as those mentioned, which by test, apparently does not lose any of its good properties by the treatment; that is, its coefficient of expansion, for example, seals to a tungsten wire such as that indicated at 14. Both the "Pyrex"-seal-to-quartz and tungsten-seal-to-"Pyrex" hold, even though the tungsten wire is heated red-hot so that the "Pyrex" is collapsed and starts to flow from the quartz.

Although, as above explained, the tungsten wire 14 may be sealed directly through the degasified "Pyrex," or the like, yet in the present embodiment I have shown it beaded with "GT 70" and sealed through a tip 19 of uranium glass. "GT 70," also called "778," has about the following composition: $SiO_2$, 69%; $B_2O_3$, 26%; MgO, 1%; and $Na_2O$, 4%. Said tip is then sealed to the outer end of the adjacent "Pyrex" end chamber 13, as indicated at 20. The outer portion of each tip 19 is desirably composed of "GT 70," which also preferably extends, as a film or coating, for example, along the entire length of the wire in the seal for effecting a gas-tight union, while the inner portion or remainder is composed of uranium glass for direct sealing with the "Pyrex."

Referring to the embodiment of my invention illustrated in Figs. 3 and 4, a discharge tube 21 is shown comprising a central cylindrical section 22 of quartz and end sections 23 of "Pyrex" or other glass which has been degasified, as above explained, and sealed directly to the quartz, as indicated at 24. Through the degasified "Pyrex" 23 at each end of the tube 21 is sealed a tungsten lead-in conductor 25, the inner portions 26 of which form electrodes for the discharge through the tube 21. The tungsten should be clean and bright where it passes through the glass, as in Figs. 1 and 2. Such a condition may be obtained by beading the conductors 25 with degasified "Pyrex" prior to sealing into the tube 21. Such treatment is effected with an oxyhydrogen flame in which the tungsten wire is beaded just beyond the inner cone of the flame so that the metal remains bright and unoxidized while the glass flows thereon. Such beading has to be done fast in order to avoid oxidation. In the present instance, the tube contains a quantity of mercury 27 in order to produce a high pressure mercury discharge lamp.

It may be wondered why borosilicate glass which has a higher coefficient of expansion than quartz will, when degasified, seal directly to quartz without the development of cracking strains on cooling. I advance the idea, merely as a theory in support of the fact that the seal can be effected, that when the glass is degasified and heated to the same temperature as the quartz to which it is fused, there is an interpenetration between the molecules of the connected materials, so that the substance or compound at the union therebetween is a combination or mixture of the two, giving the effect of a graded seal with a very short intermediate connection. In any event, my invention avoids the well-known result which occurs when two vitreous materials, of fairly wide difference in coefficients of expansion, are directly sealed together.

In view of the foregoing disclosure, it will be seen that I have devised a degasified glass and simplified seal between quartz and glass, as well as an improved seal between tungsten and other similar metals and said glass, thereby avoiding the necessity for using special glasses and graded seals when connecting glass to quartz.

It will be understood that usually three or more steps have been used in sealing glass to quartz, see the Keyes et al. patent previously referred to, because the single-step sealing will not withstand the strains produced on cooling. A preferred method of treating the glass before fusing it to quartz is to heat it to a temperature in the neighborhood of 1700° C.; that is, approximately the fusion temperature of quartz, until the evolution of gas ceases and a clear melt results. Such degasified "Pyrex" may be sealed to quartz to produce a firm and gas-tight connection equivalent to that of any of the special glasses.

In effecting a union between "Pyrex" and quartz, alternative methods may be employed. In one instance, for example, I beaded degassed "Pyrex" to quartz and worked it so that finally I had a small tube section of degassed "Pyrex" which can readily be sealed to ordinary "Pyrex." In another case I made a short section of a degassed glass tube out of "Pyrex" and sealed it directly to the quartz. Polariscope examination showed that both seals are equally good as far as strains are concerned. Compressive strains seem to predominate, which is a preferred state, as cracks are less apt to develop under such strains than under tensile strains. Most glasses that have high fusion temperatures and are used in making graded seals with quartz, require that metal sealed therein be clean or bright and free from oxide at the seal. With glass degassed in accordance with my invention, this is the preferred state. However, since such degassed glasses are of the commonly known types which are used in making metal-glass seals, a little oxide is not believed to be a serious detriment.

A degasification of the "Pyrex" or other glass is valuable in improving its qualities for receiving lead-in conductors of tungsten or the like, as the glass will then seal to 25 mil tungsten, for example, or larger, and retain a vacuum. Presses so made are believed to have less strains than when treated in accordance with ordinary methods; that is, merely baking at 450 to 500° C., thereby avoiding considerable shrinkage.

Although the foregoing description applies particularly to borosilicate or hard glasses such as "Pyrex," (and especially such manufactured under the Hood Patent No. 2,035,318 of March 24, 1936, which I have found necessary to degasify in accordance with my invention in order to effect direct sealing with quartz) "Nonex," "172 A. J.," and uranium glass, yet better results may be obtained when making articles of soft glass by degasifying such glasses, rather than using them undegasified. For example, soft glass presses may be degasified with desirable results, making it possible to substitute copper or other cheaper metal for copper clad nickel steel, commonly called "Dumet," provided the metal is kept clean and unoxidized. In other words, my invention is not limited to the degasification of hard glasses, by which I means those at least as hard as "Pyrex," referring to the definition of "hardness" as found in the paragraph beginning on line 63 of page 2 of Sullivan et al, Patent No. 1,304,623, noted, but may be employed generally, except that I have not been able to seal soft glass directly to quartz.

A further advantage of degasifying glass in making metal-glass seals is that the coefficient of expansion of such degasified glass is believed to be more nearly linear, especially at higher temperatures; that is, in the neighborhood of 400° C., and over. From data collected, it is known that the coefficient of expansion of ordinary hard glasses diverges from linear at temperatures higher than about 450° C. Soft glasses show peculiar maxima in the expansivity curves at about 420° C. I therefore propose to degasify glass for overcoming these variations from the normal linear coefficients of expansion.

The degassed glass produced in accordance with my invention and through which a tungsten wire was sealed, showed a lower strain than ordinary "Pyrex" receiving a tungsten wire, even through the wire in each case was bright and unoxidized.

By virtue of degasification of the "Pyrex," and especially such produced under the Hood patent before mentioned, I have been able to make seals in which the difference in expansion between the parts sealed is as high as $20 \times 10^{-7}$, as compared with 5 to $10 \times 10^{-7}$ for ordinary glass seals.

Although I prefer using "Pyrex" as manufactured under said Hood patent, yet I may use borosilicate glasses having coefficients of expansion varying from $28 \times 10^{-7}$ to approximately that of tungsten at $42 \times 10^{-7}$. The glass of the Hood patent, however, has a coefficient of expansion of $33 \times 10^{-7}$. Degasifying such glass slightly reduces its coefficient of expansion as say to $31.7 \times 10^{-7}$, while slightly raising its softening point from 819° C. to 822° C. A further effect of degasification is to give the glass a more brilliant appearance, believed to be due to an increase in the index of refraction. Also the seals produced between my degasified glass and quartz and the other vitreous materials including 96% silica glass having lower coefficients of expansion on the one hand, and metals such as tungsten having higher coefficients of expansion, on the other hand, are tougher than those produced without degasification. It is, therefore, believed that I have produced a new glass which is useful for various purposes in addition to those for sealing to quartz and metal lead-in conductors.

Although preferred embodiments of my invention have been disclosed, it will be understood that modifications may be made within the spirit and scope of the appended claims.

I claim:

1. A seal comprising completely degasified hard glass fused directly to silica.

2. A seal comprising completely degasified borosilicate glass fused directly to quartz.

3. A seal comprising completely degasified "Pyrex" fused directly to quartz.

4. A seal in which a wire passes through a completely degasified borosilicate glass, producing a gas-tight connection.

5. A seal in which bright tungsten wire passes through completely degasified "Pyrex" without leakage.

6. The method of treating "Pyrex" for direct connection with quartz comprising merely heating to about 1700° C., until evolution of the gas ceases, and then sealing it directly to quartz.

7. The method of treating borosilicate glass to receive a lead-in conductor comprising completely degasifying said glass by heating to about 1700° C., and then sealing said conductor thereinto.

8. The method of connecting vitreous materials, comprising merely heating hard glass to about 1700° C., until evolution of gas ceases, and then sealing it directly to quartz.

9. The method of treating borosilicate glass, comprising merely heating it to about 1700° C., until evolution of gas ceases, and sealing it directly to quartz.

10. The method of making a seal, comprising completely degasifying borosilicate glass by heating to about 1700° C., and then sealing a tungsten wire therethrough.

11. The method of making a seal, comprising completely degasifying "Pyrex" by heating to about 1700° C., and then sealing a tungsten wire thereinto.

12. A seal in which tungsten wire passes through completely degasified hard glass without leakage.

13. The method of treating hard glass to receive a lead-in conductor, comprising completely degasifying said glass by heating to about 1700° C., and then sealing a tungsten wire therethrough.

14. A seal in which wire passes through a completely degasified glass, producing a gas-tight connection.

15. The method of treating glass to receive a lead-in conductor, comprising completely degasifying said glass by heating to about 1700° C., and then sealing said conductor therethrough.

GEORGE MEISTER.